(12) United States Patent　　　　(10) Patent No.:　US 12,582,978 B2
Kelly et al.　　　　　　　　　　　　(45) Date of Patent:　Mar. 24, 2026

---

(54) CATALYST DECONTAMINATION PROCESS

(71) Applicants: Richard M. Kelly, East Amherst, NY (US); Ashley Zachariah, Lewiston, NY (US); Perry R. Pacouloute, Lockport, NY (US)

(72) Inventors: Richard M. Kelly, East Amherst, NY (US); Ashley Zachariah, Lewiston, NY (US); Perry R. Pacouloute, Lockport, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 558 days.

(21) Appl. No.: 18/065,805

(22) Filed: Dec. 14, 2022

(65) Prior Publication Data

US 2023/0191389 A1　　Jun. 22, 2023

Related U.S. Application Data

(60) Provisional application No. 63/290,952, filed on Dec. 17, 2021.

(51) Int. Cl.
| | |
|---|---|
| *B01J 38/58* | (2006.01) |
| *B01J 8/02* | (2006.01) |
| *B01J 21/04* | (2006.01) |
| *B01J 21/20* | (2006.01) |

(52) U.S. Cl.
CPC ............. *B01J 38/58* (2013.01); *B01J 8/0285* (2013.01); *B01J 21/04* (2013.01); *B01J 21/20* (2013.01); *B01J 2208/00327* (2013.01)

(58) Field of Classification Search
CPC . B01J 4/001; B01J 8/0285; B01J 21/04; B01J 21/20; B01J 38/58; B01J 2204/002; B01J 2208/00327; B08B 9/08
See application file for complete search history.

(56) References Cited

U.S. PATENT DOCUMENTS

| | | | |
|---|---|---|---|
| 5,762,719 | A | 6/1998 | D'Muhala et al. |
| 8,480,812 | B2 | 7/2013 | Nath et al. |
| 9,017,488 | B2 | 4/2015 | Nath et al. |
| 2021/0340469 | A1 | 11/2021 | Zachariah et al. |

FOREIGN PATENT DOCUMENTS

| | | | | |
|---|---|---|---|---|
| GB | 2334683 | * | 9/1999 | ............. B01J 19/30 |

* cited by examiner

*Primary Examiner* — Brian A Mccaig
(74) *Attorney, Agent, or Firm* — Iurie A. Schwartz

(57) ABSTRACT

Catalyst beds in refinery reactors require periodic change out due to build-up of contamination and loss of activity. The instant invention mists a liquid chemical solvent in nitrogen carrier gas to solubilize oils and heavy hydrocarbons and to further desorb light hydrocarbons and remove hydrogen sulfide ($H_2S$), to effect decontamination. This process can be advantageously combined with nitrogen cool-down processes in preparation for catalyst unloading.

20 Claims, 3 Drawing Sheets

CATALYST DECONTAMINATION PROCESS

RELATED APPLICATION

This application claims the benefit of U.S. Provisional Application Ser. No. 63/290,952, filed on Dec. 17, 2021, which is incorporated herein by reference.

BACKGROUND OF THE INVENTION

Refineries have numerous catalytic reactors including reformers, hydro-processors, isomerization units, and Claus units. Catalysts lose effectiveness and activity due to build-up of heavy hydrocarbon deposits and presence of process poisons. Many catalysts need to be changed after three or four years for example, where the reactor is de-inventoried of product and the spent catalyst is decontaminated, cooled, and safely un-loaded. Decontamination is usually required to avoid hazards in unloading, for example by removing light hydrocarbons that have a lower explosive limit (here-inafter, "LELs"), or hydrogen sulfide (H₂S) which has a lower explosive limit but that is also toxic. While oils or hydrocarbon deposits are less hazardous, they can clump catalyst particles together with pockets of the afore-men-tioned LELs and coat catalyst surfaces, making full LEL removal harder. Most of the catalyst change-out steps are undertaken under an inert or substantially oxygen-free atmo-sphere to mitigate LEL explosion or if the catalyst material is pyrophoric or if pyrophoric contaminants are present.

After de-inventorying of product from the reactor, some refineries choose to cool the catalyst, flood it with water, and remove it as a slurry (hereinafter "wet dump") to avoid the decontamination step, but this presents an even larger waste disposal issue. Most of the catalyst decontamination meth-ods include techniques performed at elevated temperature (typically greater than 250° F.) since heat aids in removal of contaminants through stripping and vaporization. Many refineries will decontaminate the catalyst at temperatures ranging from about 350 to 400° F. using vaporized cleaning solvents carried in hot process gas or steam (vapor phase cleaning as described in U.S. Pat. Nos. 8,480,812 and 9,017,488 assigned to Refined Technologies, Inc.). This is particularly effective in solubilizing and removing oils and heavy hydrocarbon deposits. The carrier gas, or steam, is also used to effectively desorb LELs at a similar tempera-ture. If the reactor is relatively choked with oil or heavy hydrocarbon deposits a preceding wash with diesel or simi-lar may be performed. If the reactor is relatively free of oils or heavy hydrocarbon deposits, then the cleaning solvent may not be needed and the decontamination step can be simplified to just LEL-desorption using hot carrier gas or nitrogen (hereinafter "hot strip").

Injection of solvents into the reactor system is a relatively short process in the decontamination and cooling process. The introduction of solvent could be as short as a couple of hours whereas the cooldown portion of the reactor turn-around could take as long as 2-3 days. This is because there might be up to a million pounds of total catalyst and inert weight to cool. The subsequent cool-down step after decon-tamination is often accelerated by injecting cold nitrogen (N₂) into the reactor, according to established offerings such as "Once-through cooling", "NiCool®" or "JetCool™, by the assignee of this invention, Linde. These assisted cooling techniques can save many hours to the customer and thus provide time saving value. Before any catalyst change-out work can be performed on these units, the reactors must be cooled to ensure process and personnel safety. Refineries commonly use recycle compressors to recirculate nitrogen or process gas through reactors early in the procedure with heat rejection to the atmosphere or cooling water via a heat exchanger. The high initial cooling rate cannot be sustained as the reactor cools below 300° F. since the heat exchange temperature differential diminishes. This is when assisted cooldowns can sustain the rapid cooling rate using the capabilities of nitrogen pumping equipment to perform a Once-Through or NiCool or JetCool service. During a Once-Through cooldown, cool nitrogen gas (at temperatures as low as about 40° F.) is flowed through the reactor and vented after one pass. In the NiCool method, liquid nitrogen is injected or sparged into a recirculated gas stream before the gas enters the reactor, to achieve a temperature as low as 40° F. This technique might consume about one-third the amount of nitrogen as a Once-Through cooldown. The JetCool method of cooldown utilizes a jet compressor, a type of pump that uses pressure energy of a motive fluid con-verted to velocity energy, to create a suction zone in the body of the jet compressor. The jet compressor is used to enable partial recirculation of the process stream effluent combined with fresh coolant gas. The temperature of the combined fluid is controlled by raising or lowering the temperature of the fresh coolant gas and manipulating the ratio of the recirculated effluent gas to fresh coolant gas, and again may be as low as about 40° F.

The decontamination and cooling steps are typically con-ducted at elevated pressures ranging from 50 to 300 psig or more to minimize pressure drop and allow higher mass flows through the system.

A new decontamination service marketed as IN2ERT™, accelerated purging and cleaning services, has been success-fully developed by Linde for application in tanks, process vessels and heat exchangers for instance. Liquid phase solvents are misted into nitrogen gas and passed through contaminated equipment to effect vapor space and equip-ment surface decontamination. This is described in U.S. Patent Application Publication No. 2021/0340469 A1 to Zachariah et al. and incorporated by reference in its entirety.

SUMMARY OF THE INVENTION

1. In one aspect of the invention, a method for decon-taminating a reactor system containing at least one catalyst is provided. The method includes:
   a. providing a water-free carrier gas from a water-free carrier gas source at a first mass flow rate;
   b. providing a non-aqueous liquid solvent from a non-aqueous liquid solvent source at a second mass flow rate, and adding said solvent to said carrier gas to create a mist of liquid solvent droplets in carrier gas, wherein said non-aqueous liquid solvent and said carrier gas are provided at a mass flow rate ratio in the range 0.1 to 8; the delivered mist has a tempera-ture in the range 50 to 400° F. and a pressure in the range 50 to 500 psig, wherein a majority of the provided solvent remains a liquid phase in the deliv-ered mist;
   c. delivering said mist into the reactor system and contacting the mist with at least a portion of the catalyst, wherein the initial temperature of said at least a first portion of catalyst in the reactor is between 250 and 450° F. prior to delivering said solvent mist into the reactor system; and
   d. removing contaminants from the reactor system, wherein a substantial amount of said contaminants are solubilized by said solvent and removed from said reactor system in a vapor or liquid form.

Whilst a fine mist of liquid solvent droplets in carrier gas is preferred, it is more generally only required to disperse the liquid solvent in the carrier gas such that it can be effectively transported by the carrier gas to the reactor that is to be decontaminated. The term mist and liquid dispersion are used herein interchangeably. A high shear mixer is advantageously used to aid formation of the mist, wherein the high shear mixer comprises at least one of an eductor, a spray nozzle, an orifice, and a tee. As can be appreciated by those skilled in the art, other high shear mixing devices can also be utilized.

The carrier gas is considered substantially water-free but may have minor amounts of water vapor at less than about 100 ppm on a volume basis. The solvent is considered non-aqueous but may have minor amounts of water present at less than about 1% on a weight basis.

BRIEF DESCRIPTION OF THE FIGURES

The above and other aspects, features, and advantages of the present invention will be more apparent from the following figures, wherein.

DETAILED DESCRIPTION OF THE INVENTION

In a surprising finding, it has been found that oils and heavy hydrocarbon deposits can be effectively removed from catalyst beds by treatment with a mist of liquid solvent in nitrogen carrier gas. Nitrogen can be provided from a nitrogen source such as a nitrogen pumper, nitrogen generator, a trailer mounted nitrogen vaporizer unit, high pressure nitrogen cylinders or tubes, a nitrogen pipeline, or a combination of nitrogen source options and delivered to reactor at a controlled mass or volumetric flow rate. The solvent is provided from a solvent source such as a chemical tote or drum or tanker and is also delivered in a controlled mass or volumetric flow rate. Total flow ranges are dependent on the system to be purged or decontaminated and could vary from 20,000 over 1 million standard cubic feet per hour (scfh). Preferably the solvent is a relatively high boiling non-aqueous hydrocarbon or oxy-hydrocarbon such as a naturally derived terpene. D-Limonene is a preferred solvent having a boiling point of approximately 332° F. at 0 psig, increasing to approximately 490° F. at 50 psig and approximately 680° F. at 300 psig, as predicted by thermodynamic modeling. The solvent is misted into nitrogen carrier gas at moderate temperatures in the range of approximately 100 to 400° F., pressures in the range of about 50 to 500 psig and at a mass flow ratio to nitrogen in the range of approximately 0.1:1 to 8:1, whereupon the majority of the solvent remains in the liquid phase. Preferred solvents can have associated autoignition temperatures as part of their physical properties and it is preferred that the treatment temperature is below the auto-ignition temperature of the respective cleaning solvent during treatment. For example, the preferred solvent D-limonene, a naturally occurring terpene has an auto ignition temperature of 459° F., hence the treatment temperature is preferred to be below about 450° F.

The solvent mist in nitrogen is conveyed to the target reactor via inlet piping and/or temporary hoses, with the reactor typically being at a similar temperature to the inlet solvent mist in nitrogen stream, or optionally up to 200° F. hotter. Previously, the IN2ERT, Accelerated Purging and Equipment Cleaning process has been used to effectively decontaminate vapor spaces and clean equipment surfaces, whereas now, the IN2ERT, Catalyst Decontamination process has also been found to be effective at decontaminating packed beds of granular materials having high surface area and porosity, which present a higher degree of difficulty when it comes to contaminant removal. These granular materials include catalysts, adsorbents and reactive getter materials.

Figure 1:
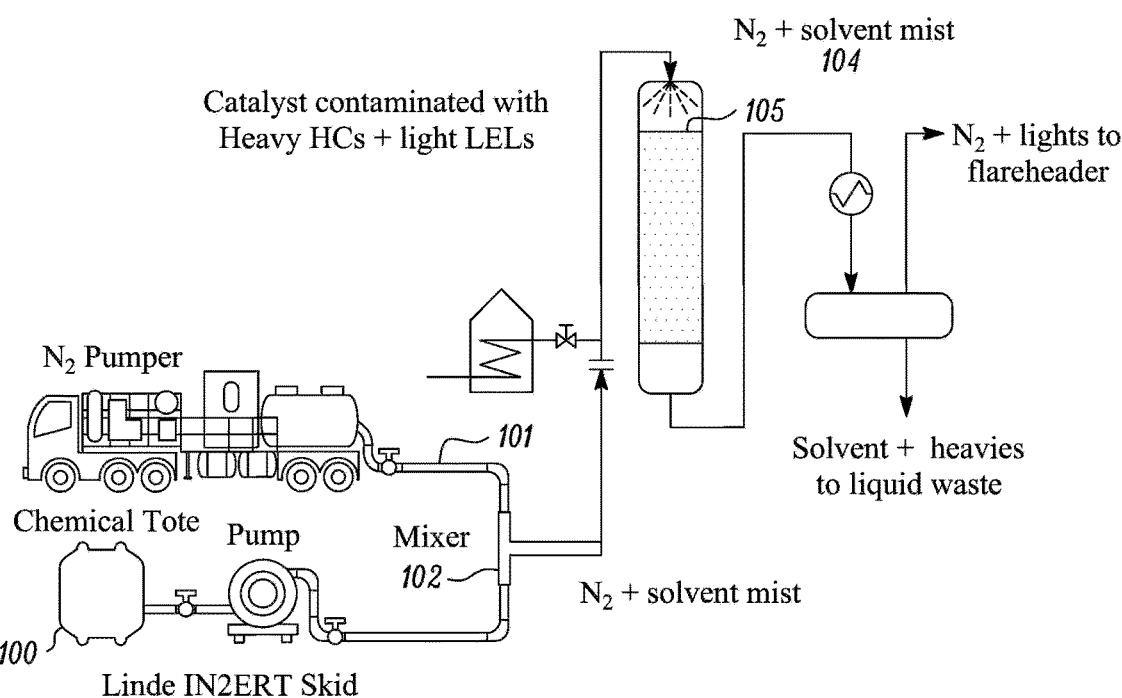
FIG. 1 is a schematic representation of a solvent mist in nitrogen carrier gas being introduced into a catalytic reactor.

The reactor is first de-inventoried of product, then partially cooled to moderate temperature with nitrogen gas or by conventional refinery cooling operations. With reference to FIG. 1, the chemical solvent 100 is introduced into the nitrogen stream 101 via a high shear mixer 102, such as a nitrogen-driven eductor, a spray nozzle, an orifice, or tee or any suitable device or other fluid flow arrangement that creates a fine mist of liquid droplets of the solvent dispersed in nitrogen. The mist is typically carried into the top of the reactor 104 via inlet piping by the nitrogen stream where it enters the reactor 104 and first contacts the top of the catalyst bed 105. Optionally, the solvent in nitrogen mist can be injected at multiple points into the catalyst bed to further improve contacting and contaminant removal. The flow of mist is sustained for approximately thirty minutes to four hours, during which time the solvent contacts the catalyst bed, substantially solubilizing oils and heavy hydrocarbon contaminants, and removing them with the flow of nitrogen gas. After the solvent has been added, the solvent flow is stopped and the flow of nitrogen is preferably continued to further carry the solvent through the catalyst bed. The combined solvent and oil/heavy hydrocarbon effluent can be removed from the nitrogen gas downstream of the catalyst bed by cooling, condensing and phase separation for example.

As will be understood by those skilled in the art, the catalyst bed will act like a filter to separate out the solvent mist from the nitrogen gas, providing contact of the liquid solvent with contaminants in the upper portion of the catalyst bed and thereby solubilizing them. The solvent being a liquid below its boiling point (approximately 490 to 680° F. over the pressure range 50 to 500 psig) but applied at moderate temperature in nitrogen (100 to 400° F.) has significant vapor pressure, also causing a portion of it to vaporize and be carried further down the catalyst bed in the vapor phase, whereupon it contacts more contaminants solubilizing them and effecting removal. Some of the solvent will also be transported lower in the bed as a mist, or as coalesced liquid. Over the decontamination period, contaminants are removed from the top of the bed down, until substantially all contaminants are removed. The application of the solvent as a liquid phase mist has several advantages, including:

(i) the ability to introduce a large volume of solvent to the reactor in a relatively short amount of time;

(ii) the ability to transport the liquid solvent in a carrier gas to the reactor and disperse the solvent across the catalyst cross-section;

(iii) the filtering out of the liquid mist by the catalyst bed, causing the solvent to be held up by the bed increasing residence time and contact time with the contaminants;

(iv) by subsequent evaporation in the catalyst bed, the solvent also acts to further remove heat from the catalyst bed, which can add to the cooling effect of the nitrogen carrier gas; and (v) when combined with nitrogen cool-down before, during and after chemical mist injection, there is a seamless integration of both the decontamination and cool-down processes, presenting time savings.

After the heavy contaminants have been substantially removed with the solvent, nitrogen continues to flow through the reactor to desorb remaining light hydrocarbons and H₂S (LELs). The nitrogen can also be used to simultaneously cool the reactor, to save time. Again, pressures for decontamination and cooling are typically in the 50 to 500 psig range and can be varied during these processes. Accounting for minimum reactor pressure to push any residual liquids, pressure drop due to piping and any ancillary equipment, the minimum pressure typically used in reactor systems is 50 psig. Desorption of light LELs from the catalyst for example will be more effective at lower pressures in this pressure range.

The method described above, in an exemplary embodiment comprises once through cooling of a reactor where cold nitrogen is supplied from a nitrogen supply source and delivered at a temperature in the range of 40-300 F after the decontamination process. Cooling down of reactors containing catalysts with significant mass is rate limited after 300 F. This can be sped up to provide an enhanced cooldown using colder nitrogen. Utilization of colder nitrogen is also sometimes referred to assisted cooldown. The cooling method in the exemplary embodiment includes:

I. Completion of the decontamination process to remove any oils bound to catalyst particles II. Supplying nitrogen from a nitrogen source such as a nitrogen pumper in the range of 40 F-300 F to a reactor system to cool said system to 100 F in less time than an unassisted cool down.

III. Continuing to flow cold nitrogen gas until LELs in the exiting gas stream reach <20% of the lower explosive limit.

The method described above, can also be through direct cooling of the reactor system wherein the system is cooled with a cooling stream routed from a non-mechanical pump where the cooling stream is a combination of a vaporized motive fluid stream with at least a portion of an effluent gas stream from the unit operation wherein the cooling method includes:

i. circulating a portion of the effluent stream with the non-mechanical pump wherein the vaporized motive fluid provides motive force ii. combining the effluent stream and vaporized motive fluid in the non-mechanical pump to deliver a combined stream temperature in the range of 40 to 300 F iii. adjusting the mass ratio of the flow rates of the unit operation effluent; and iv. continuing to flow nitrogen until the LELs in the exiting gas stream reach <20% of the lower explosive limit, and preferably <10%.

In another embodiment, the method is carried out by direct cooling the reactor system wherein the system is cooled with a cooling stream routed from a non-mechanical pump where the cooling stream is a combination of a vaporized motive fluid stream with at least a portion of an effluent gas stream from the unit operation wherein the cooling method includes:

v. circulating a portion of the effluent stream with the non-mechanical pump wherein the vaporized motive fluid provides motive force vi. combining the effluent stream and vaporized motive fluid in the non-mechanical pump to deliver a combined stream temperature in the range of 40 F to 300 F; and vii. adjusting the mass ratio of the flow rates of the unit operation effluent; and continuing to flow nitrogen until the LELs in the exiting gas stream reach <20% of the lower explosive limit.

In yet a further embodiment, the method is carried out by the steps outlined above, and sparging or injecting liquid nitrogen from a liquid nitrogen source directly into the effluent stream from reactor system to reduce the effluent stream temperature to 40 F to 300 F; and; continuing to flow cold nitrogen gas until the LELs in the exiting gas stream reach <20% of the lower explosive limit.

To conclude, and with reference to the examples, the solvent mist decontamination process is effective at oil and heavy hydrocarbon removal and presents opportunities to save, time, nitrogen and solvent volumes, especially when combined with nitrogen cool-down. Light LEL desorption with nitrogen or other pure gases (hot stripping) is well known in the art and whilst not illustrated here, is fully expected to be enhanced by the substantial removal of oil and heavy hydrocarbons of the present invention.

The invention is further explained through the following examples which compare to the related art and should not be construed as limiting the present invention.

Figure 2:
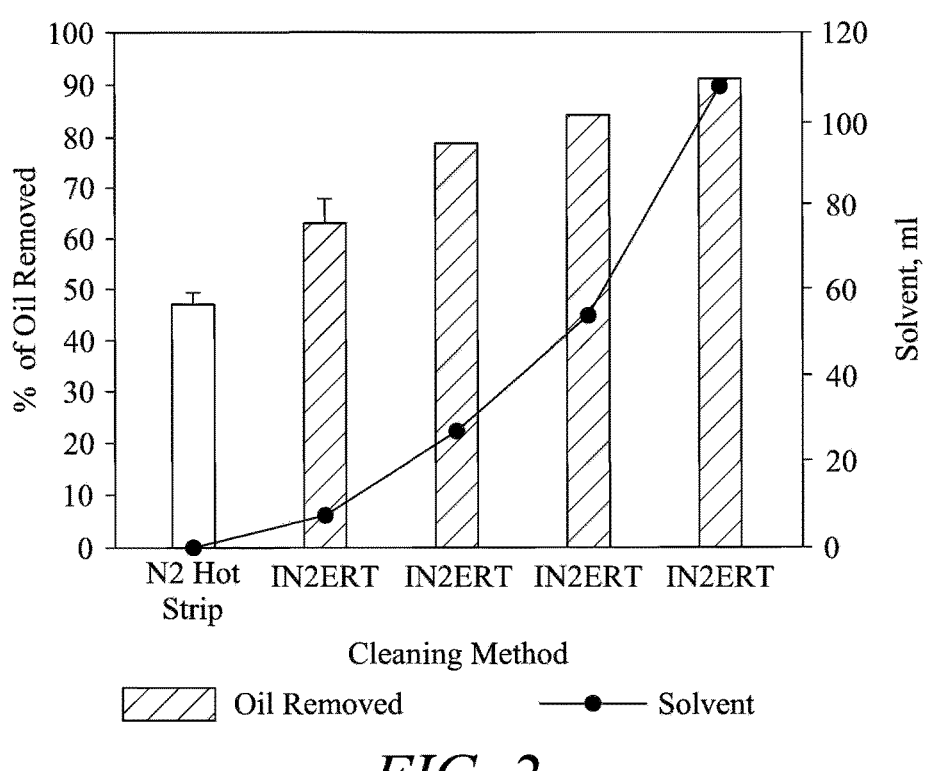
FIG. 2 is a graphical representation of an experiment in accordance with Comparative Example 1, depicting the efficacy of oil removal by a hot strip process vs solvent mist in nitrogen carrier gas (i.e., IN2ERT Catalyst Decontamination) (present invention).
Figure 3:
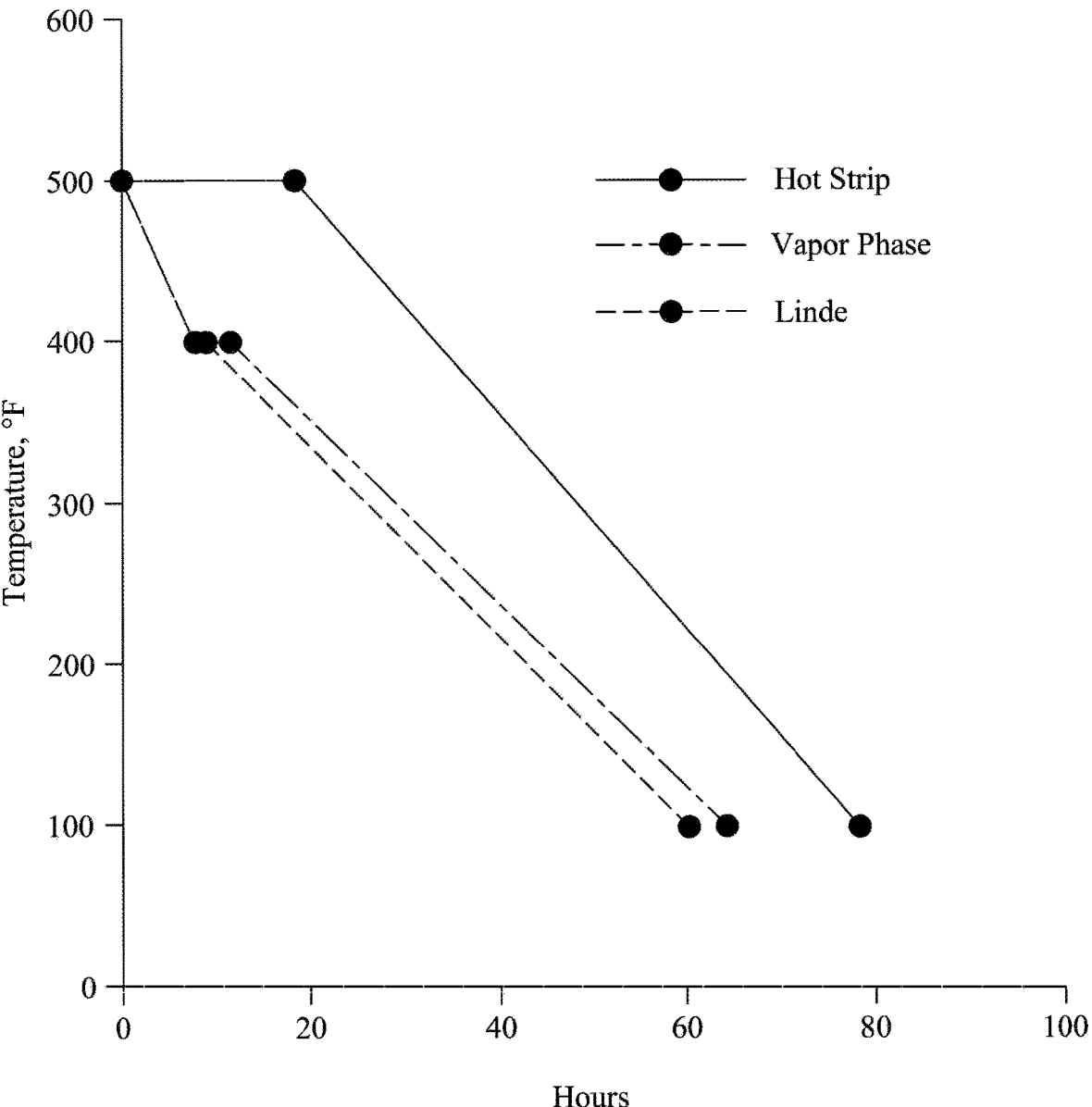
FIGS. 3 and 4 are a depiction of modeled reactor decontamination and cool-down times, for a nitrogen hot strip (of the related art) vs. solvent mist in nitrogen (i.e. IN2ERT of the present invention).
Figure 4:
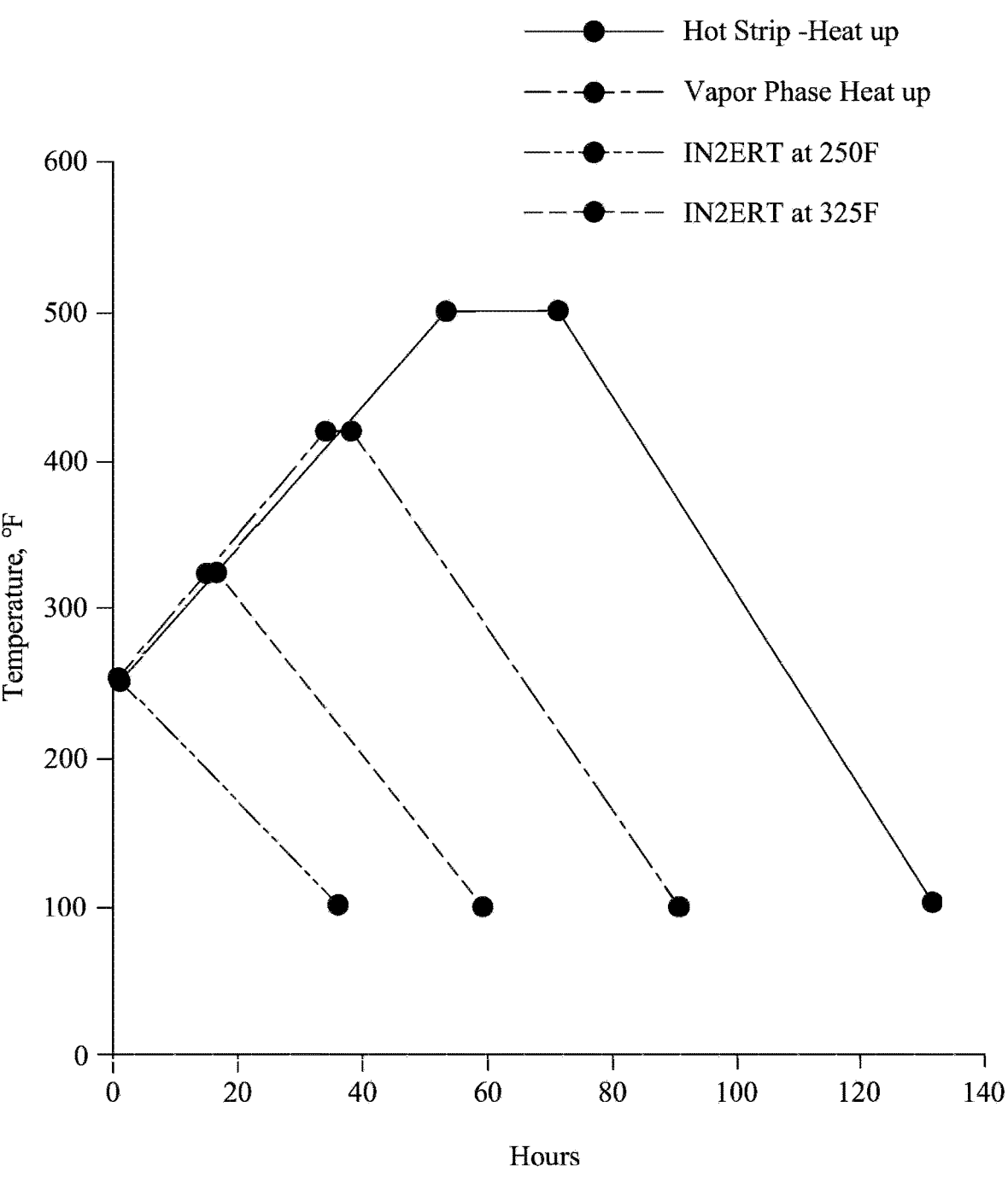

Example 1: The decontamination process was tested in a laboratory setting, using gamma alumina particles that were soaked in oil for 72 hours. In this specific example, nitrogen hot strip, and the IN2ERT catalyst decontamination processes were compared. All tests use oil-soaked alumina (55 g). Reactor dimensions were Height, H=10 in×Diameter, D=0.875 in, with a volume of 98.5 ml filled with oil-soaked alumina. For the nitrogen hot strip, the decontamination time was 2 hours. In this method, hot nitrogen only was used to remove oil from the catalyst beads. The nitrogen flowrate was 100 sccm, at a pressure of 300 psig and reactor temperature of 200° F. In the IN2ERT reactor decontamination case, various experiments were carried out wherein the decontamination treatment was performed with different solvent loadings in nitrogen. The total solvent delivered ranged between 5 and 115 ml. The nitrogen flowrate of 100 sccm stayed the same. For comparison to hot stripping, the decontamination treatment was also performed for 2 hours. The results are shown in FIG. 2, where is can be seen that up to 90% of the oil was removed from the catalyst bed, compared to only 50% removal with the hot nitrogen strip, as determined by a material balance Example 2: The IN2ERT catalyst decontamination process was simulated in conjunction with the nitrogen cool-down process for an example reactor. The conditions and results are depicted in FIGS. 3 and 4 vs hot nitrogen stripping vs vapor phase cleaning alternatives. Heat up and cool down models were performed using a proprietary Linde Services Engineering program. Comparative analysis was done for two specific cases, a) When the reactor is hot (500°

F.) and requires decontamination and b) When the reactor has been partially cooled down already (250° F.). It can be seen that:

(i) When the reactor is at 500° F., hot nitrogen stripping takes 78 hours to hot strip and cool down the reactor to 100° F. The IN2ERT catalyst decontamination process saves at least 3 hours compared to vapor phase cleaning and provides 12-24 hours of time savings compared to hot N2 stripping.

(ii) If the reactor is already partially cooled to start with as can be the case in turnaround scheduling, Linde, IN2ERT liquid phase decontamination can save 3-4 days compared to $N_2$ hot stripping process and up to 2 days compared to vapor phase cleaning. An additional benefit is >50% $N_2$ savings vs alternatives, when implemented at a lower temperature. IN2ERT catalyst decontamination can be completed at lower temperatures versus the alternatives. This enables quicker treatment versus requiring heat up time to reach vapor phase or hot stripping temperatures. Reactor information on which heat up and cooldown models were performed is as follows:

Example Reactor Information

| Reactor Type: | Naphtha Hydrotreater |
|---|---|
| Unit Capacity | 21.000 bpd crude |
| Total weight: | 284890 lbs (105000 catalyst) |

Assumed reactor pressure 200 psig; Once through N2 cooling rate 160,000 scfh; hot $N_2$ heating rate 100,000 scfh. Equivalent chemical usage assumed for both vapor phase and liquid phase processes.

We claim:

1. A method for decontaminating a reactor system containing at least one catalyst comprising the steps of:

a. providing a water-free carrier gas from a water-free carrier gas source at a first mass flow rate;

b. providing a non-aqueous liquid solvent from a non-aqueous liquid solvent source at a second mass flow rate, and adding said solvent to said carrier gas to create a mist of liquid solvent droplets in carrier gas, wherein said non-aqueous liquid solvent and said carrier gas are provided at a mass flow rate ratio in the range 0.1:1 to 8:1; the mist has a temperature in the range 50 to 400° F. and a pressure in the range 50 to 500 psig, wherein a majority of the provided solvent remains a liquid phase in the mist, wherein greater than 50% of the provided solvent remains in liquid form in the mist;

c. delivering said mist into the reactor system; and contacting the delivered mist with at least a first portion of catalyst, wherein the initial temperature of said at least a first portion of catalyst in the reactor is between 250 and 450° F. prior to delivering said solvent mist into the reactor system; and d. removing contaminants from the reactor system, wherein a substantial amount of said contaminants are solubilized by said solvent and removed from said reactor system in a vapor or liquid form.

2. The method of claim 1, wherein a high shear mixer is used in the formation of the mist, where the high shear mixer is selected from the group consisting of at least one of an eductor, a spray nozzle, an orifice, and a tee.

3. The method of claim 1, wherein the carrier gas is one of at least nitrogen, hydrogen, fuel gas, methane, ethane, or a mixture thereof.

4. The method of claim 3, wherein the carrier gas is nitrogen and is supplied from a liquid nitrogen source.

5. Method of claim 3, wherein the mass ratio of solvent to carrier gas is between 0.1:1-4:1.

6. The method of claim 1, wherein the solvent is a hydrocarbon or oxy-hydrocarbon.

7. The method of claim 6, wherein the solvent comprises a $C_6$-$C_{20}$ molecule.

8. The method of claim 6, wherein the solvent is a terpene hydrocarbon.

9. The method of claim 6, wherein the solvent is a D-Limonene hydrocarbon.

10. The method of claim 1, wherein the reactor system is a hydro-processing reactor.

11. The method of claim 1, wherein the reactor system includes a packed bed of granular media.

12. The method of claim 11, wherein the granular media comprises at least one of an adsorbent, a getter material, or a catalyst.

13. The method of claim 1, comprising the further step of continuing to flow nitrogen until flammable gases in a gas stream exiting the reactor system reach <20% on a volume basis of their lower explosive limit (LEL).

14. The method of claim 1, wherein temperature of the combined carrier gas and solvent mist is approximately equal to the reactor temperature during catalyst decontamination and nitrogen flow is continued until flammable gases is less than 10% on a volume basis and catalyst temperature is less than 100° F.

15. The method of claim 1, wherein the temperature of the combined carrier gas and solvent stream is cooler than the temperature of the reactor temperature during the decontamination process and nitrogen flow is continued until flammable gases is less than 10% on a volume basis and catalyst temperature is less than 100° F.

16. The method of claim 1, further comprising: direct cooling the reactor system wherein the system is cooled with a cooling stream routed from a non-mechanical pump where the cooling stream is a combination of a vaporized motive fluid stream with at least a portion of an effluent gas stream from the unit operation wherein the cooling method includes i. circulating a portion of the effluent gas stream with the non-mechanical pump wherein the vaporized motive fluid provides motive force ii. combining the effluent stream and vaporized motive fluid in the non-mechanical pump to deliver a combined stream temperature in the range of −50 F to 300 F iii. adjusting the mass ratio of the flow rates of the unit operation effluent; and iv. continuing to flow nitrogen until flammable gases in a gas stream exiting the reactor system reach <20% on a volume basis of the lower explosive limit.

17. The method of claim 1, further comprising:

a. continuing to flow nitrogen with or without a non-mechanical pump until flammable gases in a gas stream exiting the reactor system reach <20% on a volume basis of the lower explosive limit b. direct cooling the reactor system wherein the system is cooled with a cooling stream routed from a non-mechanical pump where the cooling stream is a combination of a vaporized motive fluid stream with at least a portion of an effluent gas stream from the unit operation wherein the cooling method includes:

i. circulating a portion of the effluent stream with the non-mechanical pump wherein the vaporized motive fluid provides motive force ii. combining the effluent stream and vaporized motive fluid in the non-mechanical pump to deliver a combined stream temperature in the range of 40 to 300 F; and iii. adjusting the mass ratio of the flow rates of the unit operation effluent.

18. The method of claim 1, further, comprising:

a. providing cold nitrogen gas from a nitrogen source such as a nitrogen pumper in the range of 40 to 300 F from a nitrogen source to the reactor system to cool said system to 100 F in less time than unassisted cooldown; and b. continuing to flow cold nitrogen gas until flammable gases in a gas stream exiting the reactor system reach <20% on a volume basis of the lower explosive limit.

19. The method of claim 1, further comprising:

a. sparging or injecting liquid nitrogen from a liquid nitrogen source directly into an effluent stream from the reactor system to reduce the effluent stream temperature 40-300° F.; and b. continuing to flow cold nitrogen gas until flammable gases in a gas stream exiting the reactor system reach <20% on a volume basis of the lower explosive limit.

20. The method of claim 1, further comprising:

a. providing cold nitrogen gas from a nitrogen source in the range of 40° F. to 300° F. to the reactor system to cool said system to 100° F. in less time than unassisted cooldown and;

b. continuing to flow cold nitrogen gas until flammable gases in a gas stream exiting the reactor system reach <20% on a volume basis of the lower explosive limit.

* * * * *